Jan. 20, 1953        R. OPPENAUER        2,625,817
DEVICE FOR MEASURING THE VISCOSITY OF LIQUIDS
Filed June 3, 1949
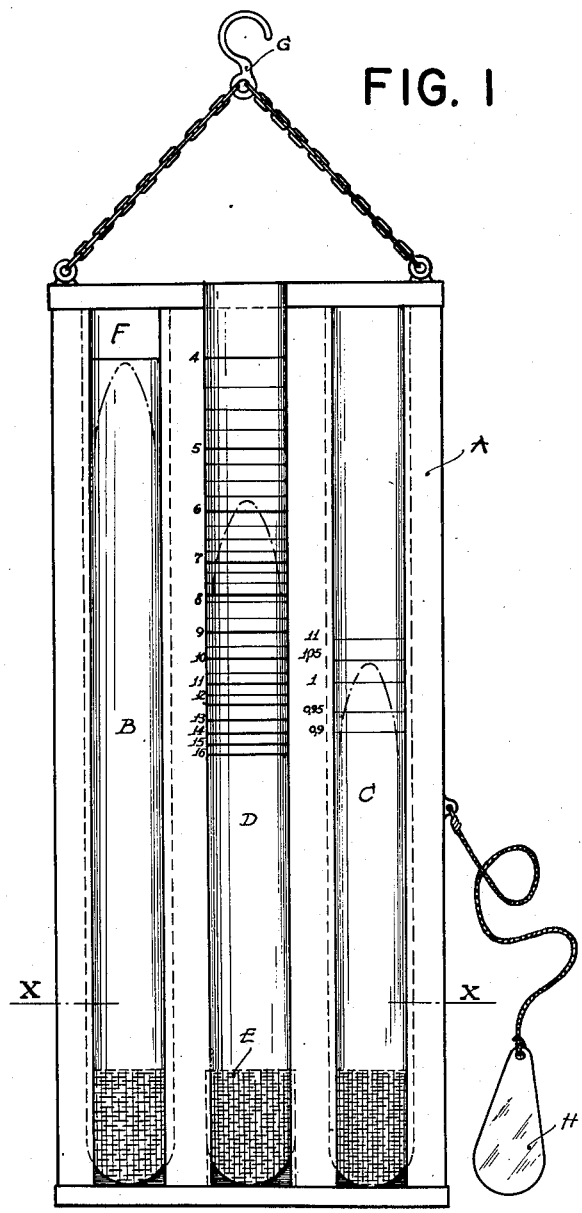
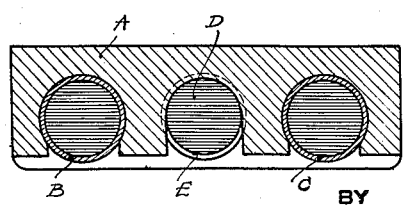
INVENTOR
RUPERT OPPENAUER
BY Linton and Linton
ATTORNEYS Patented Jan. 20, 1953

2,625,817

UNITED STATES PATENT OFFICE 2,625,817

DEVICE FOR MEASURING THE VISCOSITY OF LIQUIDS

Rupert Oppenauer, Buenos Aires, Argentina

Application June 3, 1949, Serial No. 96,926

2 Claims. (Cl. 73—54)

Devices known up to the present for measuring the viscosity of liquids work according to entirely different principles. For instance, for such measuring, we may use the speed of movement of a heavier or lighter specific body (air sphere or bubble) within the liquid to be examined; other methods are based on the speed of flow or on the speed of discharge of the liquid to be examined through capillary media.

All these devices have one thing in common, that for determining viscosity absolutely, besides the measuring instrument proper, additional means are required, such as thermometers, and occasionally also verification tables. Owing to this fact, a real measurement as a rule can only be obtained in a laboratory, by experienced people, and in practice, for example in the checking of lubricant flows in running machines the measurement of viscosity becomes quite a problem, principally if such measurement is to be made by inexperienced people, with little loss of time and effort.

This invention relates to a simple device for measuring viscosity, which owing to a new principle of compensation, represents advantages that the apparatus hitherto known do not possess or only possess partially:

(1) For measurements according to the invention no thermometer is needed;

(2) No chronometer is required for counting seconds;

(3) Measurement may be made within a large scale of temperature, for instance in lubricants, from 12 to 40° C., without having to measure temperature in each case; notwithstanding given values of viscosity may be read directly;

(4) Little loss of time in making the measurement;

(5) The measurement may be made by the guidance of simple indications of use, by completely inexperienced people (workmen).

(6) Small loss of material (about 2 cm.$^3$ of the liquid to be examined).

(7) No influence whatever on the measurement by fouling (for example carbonization products, water, etc., in lubricants for diesel engines).

(8) Comparatively great accuracy (3–6%) within large ranges (for example 4–11 degrees Engler).

(9) Easy cleaning of the apparatus in one minute or less.

(10) Simple and cheap construction.

(11) Great stability.

(12) The apparatus has no loose parts.

(13) Reduced weight and great facility for transport.

To make this description more readily understandable, the invention has been illustrated, by way of example only, in the accompanying drawings, in which:

Figure 1 shows a frontal elevation of an apparatus for measuring viscosities according to the invention.

Figure 2 shows in plan projection a section made on line X—X of Figure 1.

In said drawing "A" indicates the plate serving as base for the assembly of the apparatus, and which plate may be of wood or any other suitable material, and in which have been secured two transparent tubes B and C between which is a gaged groove D the curvature radius of which corresponds exactly to the inside diameter of tubes B and C. At the end of groove D is formed a small container E the diameter and curvature radius, internally, correspond exactly to those of tubes B and C. Finally there is conveniently provided a small spoon H to take up the oil overflowing the level of the opening of container E. The apparatus may hang from any suitable projection by means of a hook G.

Tube B contains 1½ to 2 grammes of a standard oil (in the case of the apparatus shown in the drawing for checking lubricants of 4–16 degrees Engler) of a viscosity of 4° Engler at 50° C.

Said tube is tightly sealed, and the oil, if desired, may be coloured by means of a lipoidally soluble dye (Turkish red). Tube C contains exactly the same quantity of oil, but having a viscosity of 11° Engler at 50° C. Tube B carries a mark F, and tube C is gaged as shown in the drawing. Container E is dimensioned so as to contain exactly the volume of oil as that contained in tubes B and C.

To perform a measurement, one proceeds as follows: The oil to be examined is introduced into container E filling the latter to overflowing. Then the overflow is removed through spoon H at the level of the opening of container E.

In order to render temperatures uniform, the instrument is left hanging for 10 to 15 minutes in a place where temperature ranges between 12–40° C.

Thereafter the measurement proper is made, tilting to a suitable slant the instrument so that the oil in tube B should flow by gravity and reach exactly mark F. Thereupon the inclination of the apparatus is reversed and a reading is taken on the scale of tube C of the indication left by the oil and then the indication left by the oil to be classified on the scale of groove D.

The scales in C and D have been calculated so that by multiplying the numeric values reached by the oils, the viscosity of the oil contained is determined in Engler degrees, or in any other measuring unit, for example in centipoises (cp.), calculated on a temperature determined once for all, for example: fluidity at E/50°, or 80° C. etc.

The accuracy of values is due to the fact that the fluids are being examined at the same temperature and volume during a time limited by the flow in tube B. If the oil to be examined belongs to the same type as that of the oils contained in tubes B and C, a comparison of path in the flow shall allow to determine at once the viscosity of the former, since that of the latter is already known.

In the drawing dotted lines show the measurement of the viscosity of an oil contained in E and which reaches scale 5.75 at the time oil in B reaches mark F and the content in C the scale 1.05. If we multiply 5.75 by 1.05 we obtain 6.037° Engler (E/50°) corresponding to the examined oil.

The gaging of the instrument should be made in the first tube empirically. With this instrument it is possible to measure viscosity values exceeding the viscosity of the most viscous type oil, although in such a case accuracy is no longer so remarkable. It is likewise possible to make measurements with normalized checking oil of the mineral oil type, and which have a very varying dependence of viscosity according to temperature. In this case also, accuracy of measurement decreases also, naturally, owing to the dependence of viscosity at different temperatures.

In practice, one works as a rule with oils of the same kind, for example with mineral oils, and for which the instrument is specially adapted.

Having particularly described and ascertained the nature of my invention and the manner in which same is to be carried out, I hereby declare that what I claim is:

1. A device for determining the viscosity of fluids comprising a support provided with three parallel grooves, three tubes of equal internal diameter positioned parallel to one another in said grooves, a pair of said tubes being hermetically sealed and each containing a given volume of a fluid of known viscosity, one of said pair of tubes having a mark formed thereon near an end thereof and containing a fluid of low viscosity, the other of said pair of tubes containing a fluid of high viscosity and having scale markings formed thereon according to the type of fluid therein, the third tube being closed at the lower end and open at the top and positioned between said pair of tubes but of substantially less length than said pair of tubes for receiving the sample fluid therein, said groove containing the third tube having scale markings formed thereon starting from the same level as the mark of said first mentioned tube to below the lowest mark of the scale of said second mentioned tube and graded for comparison readings of the points reached by said various liquids after the liquid of lower viscosity has reached said mark of the first mentioned tube after the tilting of said support.

2. A device according to claim 1 wherein the scale markings of the tubes containing the fluid of high viscosity and the sample fluid are positioned relative to one another according to a correction factor.

RUPERT OPPENAUER.

REFERENCES CITED

The following references are of record in the file of this patent:

UNITED STATES PATENTS

| Number | Name | Date |
|---|---|---|
| 1,266,149 | Penniman | May 14, 1918 |
| 1,637,386 | McLain | Aug. 2, 1927 |
| 1,870,412 | Kennedy | Aug. 9, 1932 |
| 1,944,164 | Bijur | Jan. 23, 1934 |
| 2,295,710 | Bostwick | Sept. 15, 1942 |